United States Patent
DeLuze

(10) Patent No.: US 11,420,152 B2
(45) Date of Patent: Aug. 23, 2022

(54) BANDPASS FILTER FOR SEPARATION OF A SPECIFICALLY SELECTED GAS FROM A GROUP OF GASES OR AN ATMOSPHERE

(71) Applicant: James Robert DeLuze, Honolulu, HI (US)

(72) Inventor: James Robert DeLuze, Honolulu, HI (US)

(73) Assignee: James DeLuze, Honolulu, HI (US)

( * ) Notice: Subject to any disclaimer, the term of this patent is extended or adjusted under 35 U.S.C. 154(b) by 0 days.

(21) Appl. No.: 16/442,533

(22) PCT Filed: Jun. 14, 2019

(86) PCT No.: PCT/US2019/037324
§ 371 (c)(1),
(2) Date: Jun. 16, 2019

(87) PCT Pub. No.: WO2020/005590
PCT Pub. Date: Jan. 2, 2020

(65) Prior Publication Data
US 2021/0138392 A1    May 13, 2021

Related U.S. Application Data

(60) Provisional application No. 62/763,728, filed on Jun. 26, 2018.

(51) Int. Cl.
*B01D 53/22* (2006.01)
*B01D 59/14* (2006.01)
(Continued)

(52) U.S. Cl.
CPC ........... *B01D 53/228* (2013.01); *B01D 59/14* (2013.01); *B01D 71/04* (2013.01);
(Continued)

(58) Field of Classification Search
None
See application file for complete search history.

(56) References Cited

U.S. PATENT DOCUMENTS

| 4,853,001 A | * | 8/1989 | Hammel | ................ | B01D 71/04 |
| | | | | | 95/47 |
| 8,090,071 B2 | | 1/2012 | Deluze | | |

(Continued)

*Primary Examiner* — Jason M Greene

(57) ABSTRACT

A method of separation of predetermined gas from the mixture of gases or an atmosphere, wherein said method of separation of predetermined gas from a mixture of gases or an atmosphere comprises passing a mixture of gases or an atmosphere through the reinforced mass selective fluid bandpass filter (8). The reinforced mass selective fluid bandpass filter comprises the mass selective fluid bandpass filter element (9) permanently affixed to the sintered metal load bearing structure (14). The mass selective fluid bandpass filter element consists of quartz glass, of either natural or manmade origin. This method provides removing predetermined gas from the group consisting of: $^1H_2$, $^1H^2H$, $^2H_2$, $^1H^3H$, $^2H^3H$, $^3H_2$, $^1H_2O$, $^1H^2HO$, $^2H_2O$, $^1H^3HO$, $^2H^3HO$, $^3H_2O$, $O_2$, $O_3$, $^{12}CO_2$, $^{13}CO_2$, $^{14}CO_2$, $^4CO$, $N_2$, $NO$, $NO_2$, $NO_x$, $SiO_2$, $FeO$, $Fe_2O_3$, $SiF_4$, $HF$, $NH_3$, $SO_2$, $SO_3$, $H_2SO_4$, $H_2S$, $^{35}Cl_2$, $^{37}Cl_2$, $F_2$, $Al_2O_3$, $CaO$, $MnO$, $P_2O_5$, phenols, volatile organic compounds, and peroxyacyl nitrates.

23 Claims, 4 Drawing Sheets

(51) Int. Cl.
  *B01D 71/04* (2006.01)
  *C01B 23/00* (2006.01)
(52) U.S. Cl.
  CPC ...... *C01B 23/0036* (2013.01); *B01D 2256/18* (2013.01); *B01D 2257/11* (2013.01); *B01D 2317/025* (2013.01); *B01D 2317/04* (2013.01); *C01B 2210/0026* (2013.01); *C01B 2210/0031* (2013.01)

(56) References Cited

U.S. PATENT DOCUMENTS

| | | | |
|---|---|---|---|
| 10,005,033 B2 | 6/2018 | McMurtry | |
| 2004/0149131 A1* | 8/2004 | Carboneri | B01D 53/228 96/4 |
| 2008/0000351 A1* | 1/2008 | Celik | F04D 25/166 95/95 |
| 2009/0173141 A1* | 7/2009 | Grosse Bley | G01M 3/205 73/25.05 |
| 2010/0260657 A1* | 10/2010 | Niitsuma | B01D 53/226 423/437.1 |
| 2014/0345457 A1* | 11/2014 | Balster | C01B 23/0047 95/53 |
| 2016/0317971 A1* | 11/2016 | McMurtry | B01D 71/04 |

\* cited by examiner

BANDPASS FILTER FOR SEPARATION OF A SPECIFICALLY SELECTED GAS FROM A GROUP OF GASES OR AN ATMOSPHERE

CROSS-REFERENCE TO RELATED APPLICATIONS

"This application is a related to U.S. Pat. No. 10,005,033 issued Jun. 26, 2018 to this inventor and to inventor Gary M. McMurtry titled: Isotopic Enrichment of Helium-3 Through Glass. This application also claims the benefit of Provisional Patent Application Ser. No. 62/763,728, filed 2018 Jun. 26 by the present inventor."

FEDERALLY SPONSORED RESEARCH

Not applicable.

SEQUENCE LISTING OR PROGRAM

No listing.

BACKGROUND: FIELD OF INVENTION

Introduction

There is a need for separation of specific gases from collections of gases or an atmosphere. Earth's atmosphere now has many noxious gases providing health hazards and also becoming damaging to the environment. It has been show that increases in atmospheric ozone is associated with increases in mortality (Dec. 26, 2017, Association of Short-term Exposure to Air Pollution With Mortality in Older Adults, JAMA, vol 318, No 24, 2246 incorporated herein by reference). Carbon Dioxide, $CO_2$, levels in the atmosphere have been steadily increasing over the years. $CO_2$ and water are the primary end products of hydrocarbon burning for energy, representing accumulation of low energy molecules not recycled back to high energy states by photosynthesis.

Photosynthesis is the main energy input to earth and we are rapidly approaching the thermodynamic equilibrium of deep space (Schramski, J. R., Gattie, D. K., and Brown, J. H., 6/8/2015, Human domination of the biosphere: Rapid dischargee of the earth-space battery foretells the future of humankind, www.pnas.org/cdi/doi/10.1073/pnas.1508353112 incorporated herein by reference). We need a high rate, primary energy source for earth that is parallel to the only input we presently have being photosynthesis. Photosynthesis is not sufficient to keep up with the energy demand of the current world's population and this lack will lead to dire consequences unless addressed.

This inventor is proposing a four step process which he has titled fusionsynthesis. Step one is production of high levels of nearly unlimited energy using efficient fusion reactors patented by this inventor (Deluze, J. R., 1/3/2012, Apparatus For Hot Fusion Of Fusion Reactive-Gases, USPTO patent U.S. Pat. No. 8,090,071 B2 incorporated herein by reference). Fusion of deuterium found in the ocean along with its waste product helium-3 will provide all the energy humanity will need into the foreseeable future.

But more than just energy is needed for the process of fusionsynthesis. Step two is commercial capture of $CO_2$ in gigaton quantities. Step three is hydrolysis of water to hydrogen and free oxygen. Step four is synthesis of hydrogen and $CO_2$ to methane and water. The water is cycled through step three to release the other oxygen. This forms an analogous parallel pathway to photosynthesis using fusion reactions here on earth as the energy source. This provides for recharging the earth-space battery, moving this world away from the thermal equilibrium of deep space.

Selective commercial capture of $CO_2$ in gigaton quantities has so far eluded all attempts. Inventors developed a high "Q" (quality) mass selective fluid bandpass filter capable of partially addressing such demands. "Q" relates to the filter's rejection characteristics of non selected gases. This filer is disclosed in U.S. Pat. No. 10,005,033 issued Jun. 26, 2018 to Gary M. McMurtry and James R. DeLuze titled: Isotopic Enrichment of Helium-3 Through Glass and incorporated herein by reference and named as prior art. Use of this mass selective fluid bandpass filter is the method of the invention presented within this application. This new invention additionally improves on the previous invention by providing a load bearing member to which the mass selective fluid bandpass filter element of the previous invention is permanently affixed. The design specifications of the unreinforced mass selective fluid bandpass filter element of the previous invention make it unable to bear differential pressures exceeding approximately 30 pounds per square inch absolute (PSIA). Pressures exceeding these values result in rupture of the mass selective fluid bandpass filter element made of quartz glass.

It has been observed that the gas flow rate through the mass selective fluid bandpass filter of the original filter increased in a one to one relationship with increasing differential pressure, with all other conditions being equal. For the need of the instrument design of the initial invention, sufficient filter flow rates were obtained with differential pressures below 30 PSIG. The selectivity and "Q" characteristics of the original mass selective fluid bandpass filter meet the requirements of commercial filtration, such as selective commercial capture of $CO_2$ in gigaton quantities. However, the original filter is severely inadequate to meet the filter flow through rate requirements needed for commercial filtration of significant amounts of gas in commercial applications.

The modified reinforced mass selective fluid bandpass filter of this invention will provide sufficient filter flow through rates for the fusionsynthesis recycling of greenhouse gases into free oxygen and methane. Methane is the precursor for synthetic hydrocarbon synthesis to provide the petrochemicals needed for modern society. In addition, it will provide for the removal from the environment of noxious gases such as ozone which are detrimental to the environment and to health. In addition it will provide for the separation of a specifically selected gas from a group of gases or an atmosphere to be commercially viable.

Researchers have evaluated the selective transmission of gas through glass including this inventor and his associates. Selective high "Q" transmittance of $^3He$ is published (McMurtry, G. M., DeLuze, J. R., Hilton, D. R., and Blessing, J. E., 3/26/2019, Differential diffusion of helium isotopes in glass, quantum tunneling $^3He$ enrichment, and portable $^3He/^4He$ monitoring of mantle processes, Scientific Reports, DOI: 10.1038/s41598-019-41360-5 incorporated herein by reference). The structure of helium passageways through quartz glass has been modeled (Boiko, G. G. and Berezhoni G. V., Migration paths of helium in α-quartz and vitreous silica from molecular dynamics data, Glass Phys. and Chem., 29, 42-48 (2003) incorporated herein by reference). These passageways included "ring like structures" connected to other shapes making a "free space" passageway across the glass structure. They could be likened to "pores" through the glass structure. In pure quartz, the volume of this "free space" contributes a significant percentage to the total volume of the involved quartz glass.

G. M. McMurtry, first author, likened this transmittance phenomenon to quantum tunneling. J. R. DeLuze, second author and present inventor, likens this transmittance phenomenon to the passage of gas through the pores of free glass space. Mass specificity and selectivity are believed to be dependent on molecular size, shape, and binding characteristics. At a given temperature and pressure differential, the shape and dynamics of the pore give selective transmission to a gas of a given Atomic Mass Unit (AMU) value over that of gases of differing AMU values. The dynamic behavior of a pore as relating to passage or blockage of a specific gas is referred to as the opening and closing of a "gate" or "port".

With pure quartz glass the ring structures are open. Adding a modifier to quartz glass in its manufacture may partially occupy or completely block the open space of the ring structures. Additionally, the modifier may incorporate into the ring structure, and or related structures, altering the dynamic behavior of the pore to gas transmission. (Encyclopedia of Chemical Technology, 3rd. edition, pp 807-19 incorporated herein by reference). At specific temperatures, pure quartz glass "leaks" helium across the glass. Addition of a lead modifier in sufficient quantity will significantly reduce or stop transmission of helium across quartz glass. Helium containers are made of heavy leaded quartz glass.

Addition of a predetermined chemical modifier in predetermined amounts will modify the gas transmittance of quartz glass to give specific selectivity characteristics, "Q", and transmittance of gas of a predetermined AMU value over gases of differing AMU values.

Figure 1:
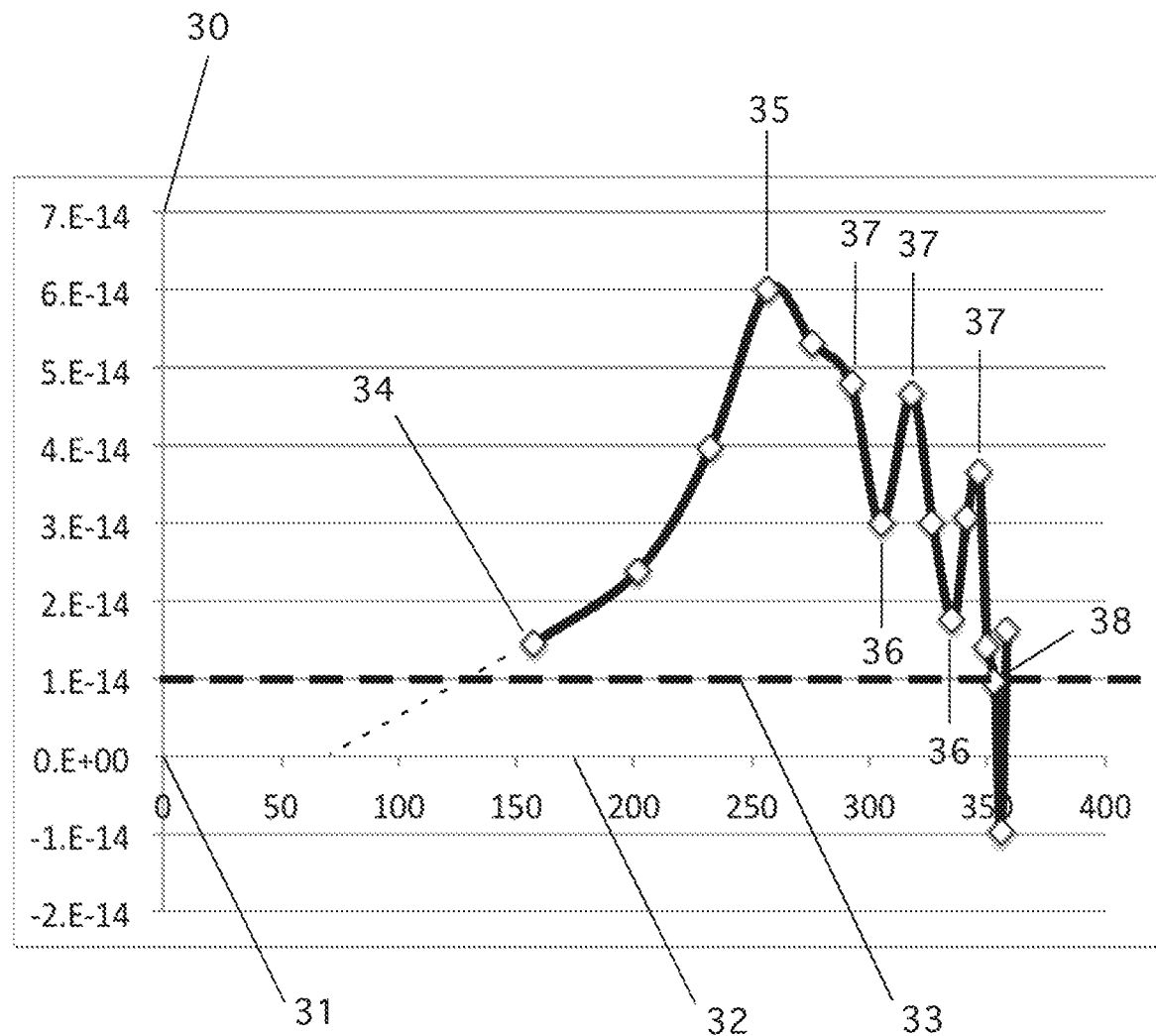
FIG. 1
Figure 2:
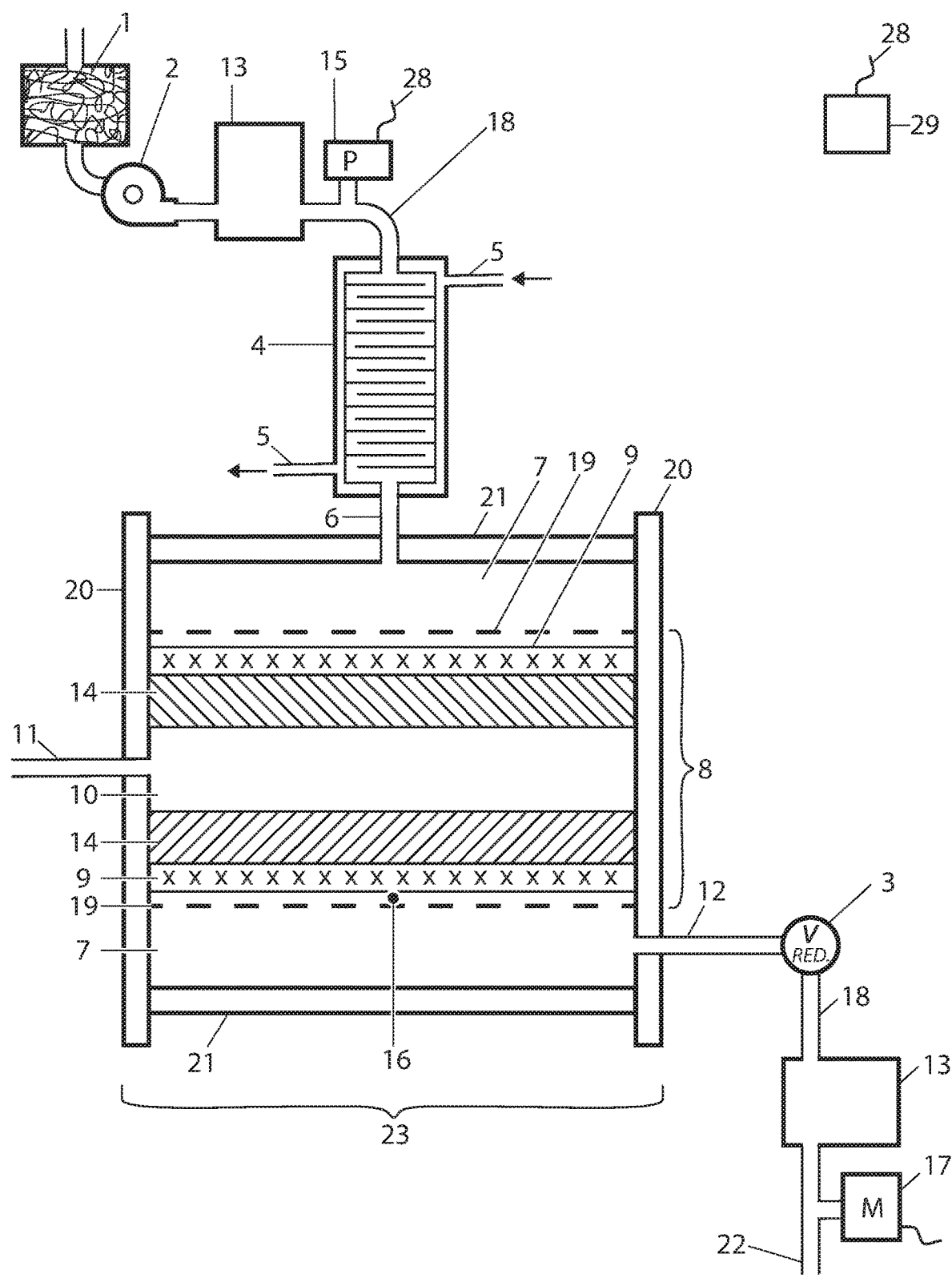
Figure 3:
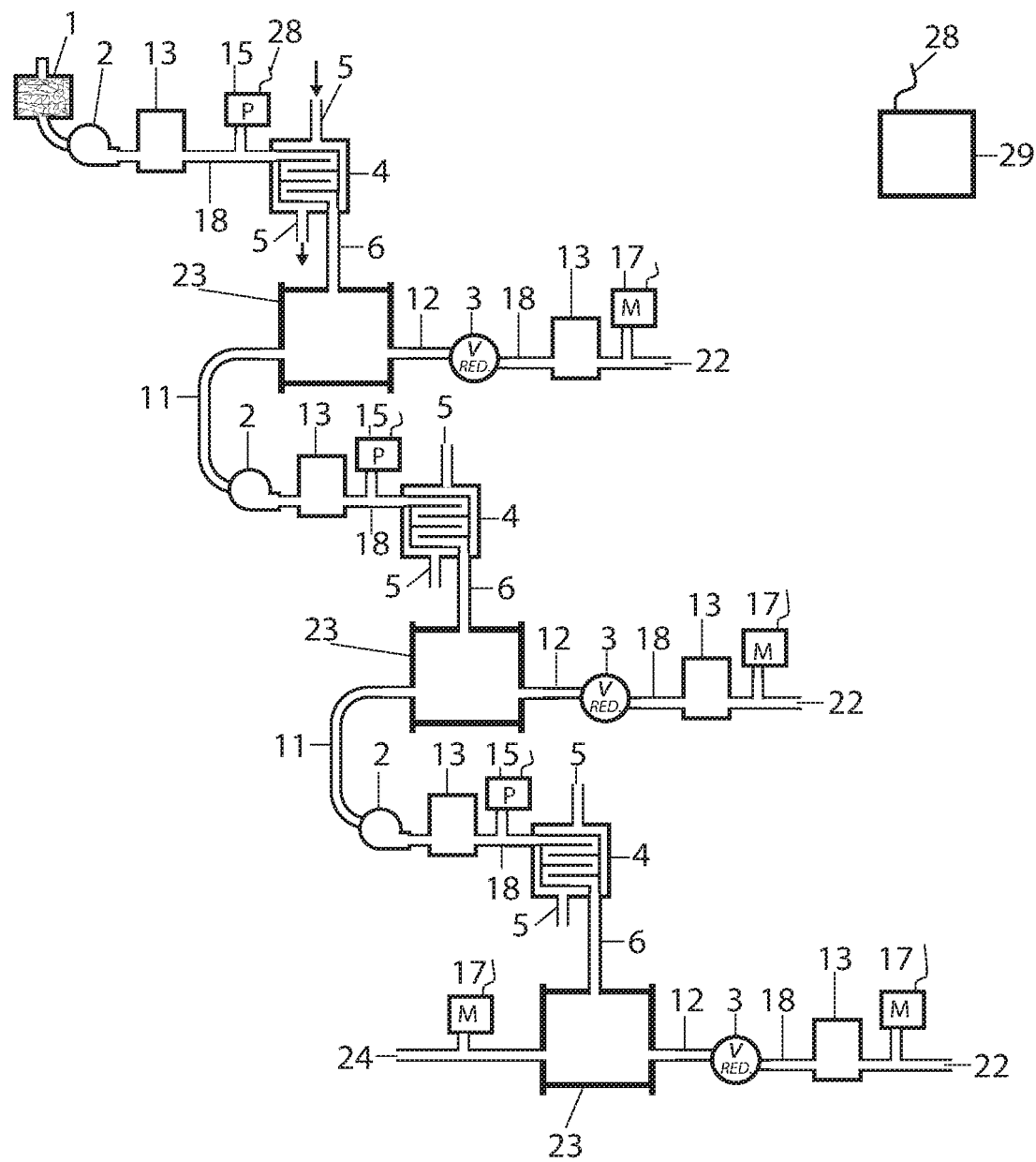
Figure 4:
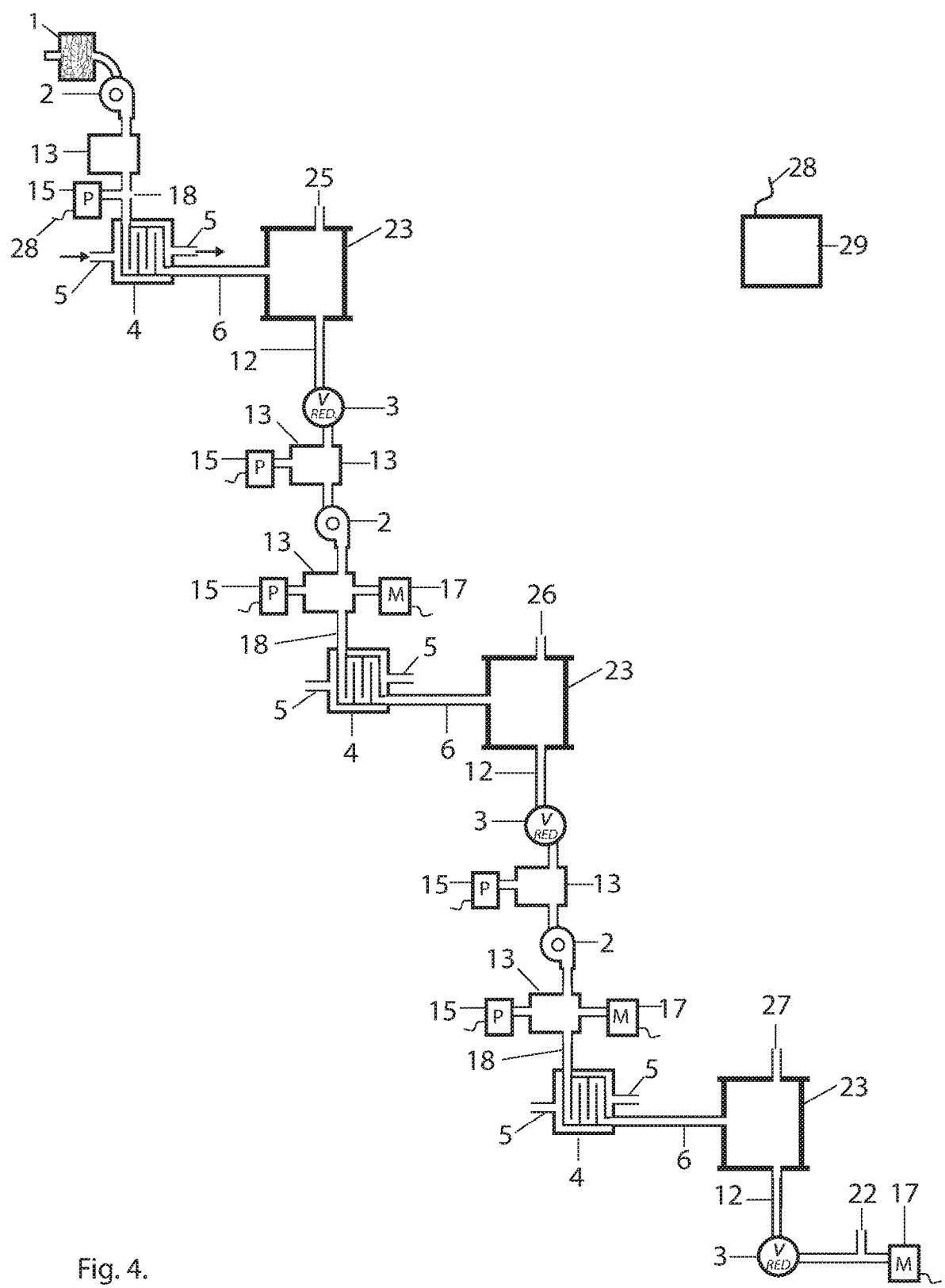

A graph of a two-dimensional Cartesian coordinate system of ordered pairs where the ordinate, the y-axis, represents the partial pressure of $^3$He in Torr, and the abscissa, the x-axis, represent the temperature in degrees Celsius. This plot shows the relative opening and closing of ports allowing conductance of $^3$He at various temperatures in the upswing of a heat ramp. This figure is from U.S. Pat. No. 10,005,033 and illustrates the opening and closing of high "Q" gates allowing transmittance of helium-3 in determination of the helium-3; helium-4 ratio by that instrument.

FIG. 2

A schematic representation of a single reinforced mass selective fluid bandpass filter hooked up with its ancillary apparatus.

FIG. 3

A schematic representation of multiple reinforced mass selective fluid bandpass filters hooked up in a series arrangement to increase the purity of the outlet gas.

FIG. 4

A schematic representation of multiple reinforced mass selective fluid bandpass filters hooked up in a sequential arrangement to remove more than one predetermined gas.

REFERENCE NUMERALS IN DRAWINGS

1. Particle filter.
2. Pump.
3. Pressure regulator.
4. Heat exchanger.
5. Heat exchanger fluid lines.
6. Gas inlet structure.
7. Gas inlet space.
8. Reinforced mass selective fluid bandpass filter.
9. Macs selective fluid bandpass filter element.
10. Gas outlet space.
11. Filtered gas outlet.
12. Non filtered gas outlet structure.
13. Surge tank.
14. Sintered metal load bearing structure.
15. Pressure sensor.
16. Temperature sensor.
17. Mass spectrometer.
18. Pipe.
19. Temperature change means.
20. Endcap.
21. Housing.
22. Non filtered gas outlet.
23. Reinforced mass selective fluid bandpass filter mounted in housing.
24. Final selected gas output.
25. Selected gas output one.
26. Selected gas output two.
27. Selected gas output three.
28. Electric cable.
29. Ancillary electronic apparatus.
30. Graph ordinate, the y-axis, representing $^3$He partial pressure in Torr.
31. Graph origin.
32. Graph abscissa, the X-axis, representing temperature in degrees Celsius.
33. Estimated noise floor of quadrupole mass spectrometer.
34. $^3$He gate opening point.
35. $^3$He gate closing point.
36. $^3$He high "Q" gate opening point.
37. $^3$He high "Q" gate closing point.
38. Point of $^3$He signal being swamped by other gases present.

DESCRIPTION OF THE INVENTION

The essence of this invention is a novel method of gas separation discovered by the previous inventors and improved upon by the present inventor. It comprises the method of separation of a predetermined gas from a mixture of gases or an atmosphere, wherein the method of separation of a predetermined gas from the mixture of gases or an atmosphere comprises passing the mixture of gases or an atmosphere through a reinforced mass selective fluid bandpass filter (8) wherein the predetermined gas is separated from the mixture of gases or an atmosphere, wherein the predetermined gas is from a group consisting of: $^1H_2$, $^1H^2H$, $^2H_2$, $^1H^3H$, $^2H^3H$, $^3H_2$, $^1H_2O$, $^1H^2HO$, $^2H_2O$, $^1H^3HO$, $^2H^3HO$, $^3H_2O$, $O_2$, $O_3$, $^{12}CO_2$, $^{13}CO_2$, $^{14}CO_2$, $CO$, $N_2$, $NO$, $NO_2$, $NOR$, $SiO_2$, $FeO$, $Fe_2O_3$, $SiF_4$, $HF$, $NH_3$, $SO_2$, $SO_3$, $H_2SO_4$, $H_2S$, $^{35}Cl_2$, $^{37}Cl_2$, $F_2$, $Al_2O_3$, $CaO$, $MnO$, $P_2O_5$, volatile organic compounds, and peroxyacyl nitrates.

The method of separation using the reinforced mass selective fluid bandpass filter comprises a mass selective fluid bandpass filter element (9) permanently affixed to a sintered metal load bearing structure (14). The mass selective fluid bandpass filter element consists of a supercooled liquid. The supercooled liquid is quartz glass. The quartz glass consists of quartz of either natural or manmade origin. The quartz glass consists of either pure quartz or the combination of pure quartz plus a predetermined chemical modifier in predetermined amounts. The chemical modifier is one or more elements from a group of elements with atomic numbers of: 1, 3-9, 11-17, 19-35, 37-53, 55-85, and 87-109; wherein the element is in the form from the group of: a metal, a gas, a molecule, a salt, a rare earth, an oxide, a chloride, an ion, a carbonate, an acid, a base, or other form appropriate to glass manufacturing conditions. The reinforced mass selective fluid bandpass filter used in this method provides for a high selectivity in gas separation.

The method of separation of the predetermined gas from the mixture of gases or an atmosphere using the mass selective fluid bandpass filter element made of quartz glass wherein the predetermined gas is separated from the mixture of gases or an atmosphere provides the method for very selective filtering of gases of close atomic mass unit values within the operational range of this filter. The mass selective fluid bandpass filter element made of quartz glass wherein a specific atomic mass unit at which maximum transmission occurs is influenced by factors including temperature of the mass selective fluid bandpass filter element made of quartz glass, thickness of the mass selective fluid bandpass filter element made of quartz glass, differential pressure across the mass selective fluid bandpass filter element made of quartz glass, and the composition of the mass selective fluid bandpass filter element made of quartz glass.

The method of separation of the predetermined gas from the mixture of gases or an atmosphere using the reinforced mass selective fluid bandpass filter made of quartz glass wherein the predetermined gas is separated from said mixture of gases or an atmosphere provides the method wherein the atomic mass unit of maximum transmission has a direct relationship with the temperature of the mass selective fluid bandpass filter element made of quartz glass.

The method of separation of the predetermined gas from a mixture of gases or an atmosphere using the mass selective fluid bandpass filter element made of quartz glass provides the method by which the specific atomic mass unit at which maximum transmission occurs is influenced by factors including temperature of the mass selective fluid bandpass filter element made of quartz glass, thickness of the mass selective fluid bandpass filter element made of quartz glass, differential pressure across the mass selective fluid bandpass filter element made of quartz glass, and composition of the mass selective fluid bandpass filter element made of quartz glass. The method of separation of the predetermined gas from a mixture of gases or an atmosphere using the mass selective fluid bandpass filter made of quartz glass provides the method wherein a species of a given atomic mass unit under set conditions is selectively transmitted, wherein species of higher and lower atomic mass unit values are selectively blocked, wherein the reinforced mass selective fluid bandpass filter element exhibits a high quality, or "Q" characteristic. The mass selective fluid bandpass filter element made of quartz glass provides the method whereby with constant temperature operation the reinforced mass selective fluid bandpass filter can selectively pass species of a predetermined atomic mass unit value. The mass selective fluid bandpass filter element made of quartz glass provides the method for very selective filtering of gases of close atomic mass unit values within the operational range of this filter. The mass selective fluid bandpass filter element made of quartz glass provides the method that is selectively semipermeable to gases to be filtered by this apparatus. The selective semipermeable action on the gases to be filtered is based on conditions of glass thickness, glass temperature, glass composition, and pressure differential across the glass.

This reinforced mass selective filter provides a method of separation of a predetermined gas from a mixture of gases or an atmosphere. The method of gas selection consists of a gas inlet structure (6), a gas inlet space (7), a mass selective fluid bandpass filter element, a gas outlet space (10), and a filtered gas outlet (11). The method of gas selection provides two internally bounded spaces which are separated by structures of titanium, stainless steel, borosilicate glass, sealing glass, quartz glass, and other metallic alloys. The mass selective fluid bandpass filter consists of a tube of sintered metal (14) upon which the quartz glass has been sealed and permanently affixed by those experienced in such art. The quartz glass has temperature sensor(s) (16) on the surface and a temperature change means (19) that is spirally wound upon its surface. The sintered metal is composed of a metal selected from the group consisting of: 1) titanium, 2) stainless steel, 3) aluminum, 4) an alloy of these metals, or 5) another metal and or alloy determined to best suit the given conditions. Temperature sensors are on the glass surface and a temperature change means is spirally wound upon the glass surface. The structures of stainless steel, borosilicate glass, and sealing glass are impermeable to the gases to be filtered by this apparatus. The quartz glass is selectively semipermeable to the gas to to be selected by this apparatus. The selective semipermeable action on the gases to be filtered described by the apparatus is based on conditions of glass thickness, glass temperature, glass composition, and pressure differential across the glass. The method of selection employs one or more of the effects selected from the group consisting of: 1) gas inlet, 2) a gas inlet space, 3) a mass selective fluid bandpass filter element, 4) a gas outlet space, 5) a filtered gas outlet, and 6) a non filtered gas outlet structure (12). The assemblage of a gas inlet, gas inlet space, mass selective fluid bandpass filter element, gas outlet space, and non filtered gas outlet structure are mounted within a housing (21) and endcap(s) (20) collectively is a reinforced mass selective fluid bandpass filter mounted in housing (23). Such units may be serially and sequentially combined. A temperature change means consists of a means selected from the group: a) metallic electric resistance tape; b) flattened tubing transporting a fluid at a predetermined temperature.

FIG. 1 shows a portion of the initial up ramp of a heat ramp wherein the gates passing $^3$He selectively opening prior to the gates passing $^4$He. This figure is an example of the behavior of the mass selective fluid filter with relation to gases $^3$He and $^4$He. Within the operation of this present invention, the operation would be similar with gates selectively opening and closing for the predetermine gases, but at pressures and temperatures that would be specific and different for each predetermined gas. This FIG. 1 is presented as an example. The graph ordinate (30), the y-axis, represents $^3$He partial pressure in Torr. The graph origin is at (31). The graph abscissa (32), the X-axis, represents temperature in degrees Celsius. The estimated noise floor of quadrupole mass spectrometer is at (33). The sample points are approximately spaced by 1 minute. (34) shows a point in time wherein $^3$He gate opening point has been passed and $^3$He is entering a high vacuum space (HV). (35) indicates a $^3$He gate closing point, for though the temperature continues to rise, the $^3$He partial pressure starts to decline. (37) indicates a $^3$He high "Q" gate closing point, for the rate of decline in $^3$He partial pressure drops much more steeply. This is followed by a $^3$He high "Q" gate opening point at (36) wherein the $^3$He partial pressure increases very steeply. This is sequentially followed by several subsequent $^3$He high "Q" gate closing and opening points, ending with a final $^3$He high "Q" gate closing point and the $^3$He signal being swamped by other gases present at point (38). The area under this curve represents the $^3$He gas accumulation during this heat up ramp phase. After this time gates open selectively to passing $^4$He. After the opening of the $^4$He gates admitting $^4$He into the mass spectrometer, with the abundance of $^4$He approximating a million times that of the $^3$He, the total gas pressure within the mass spectrometer is such that the noise floor raises to where the $^3$He can no longer be detected on further heat up ramp and or heat down ramp.

The reinforced mass selective fluid bandpass filter is a high "Q" fluid bandpass filter, an example of whose characteristics are shown in FIG. 1 and as described above, forms the method of separation of a predetermined gas from a mixture of gases or an atmosphere. What is disclosed is the method of separation of the predetermined gas from the mixture of gases or an atmosphere. This method of separation provides the mass selective fluid bandpass filter for selecting gas molecules of the specific mass from the gas sample containing molecules of two or more mass species. This filter provides the means of operation of selecting the predetermined gas from the group of gases or an atmosphere. The filter element is the supercooled liquid consisting of quartz glass. The quartz glass of the filter element consists of quartz of either natural or manmade origin.

These components and structures are assembled according to current practice of those experienced in such art. This assemblage provides two vacuum and pressure tight external connections to internally contained gas inlet and outlet structures. This space bounded by this assemblage provides two internally bounded spaces which are separated by structures of the mass selective fluid bandpass filter. The quartz glass is selectively semipermeable to the gas to to be filtered by this apparatus. The selective semipermeable action on the gases to be filtered is based on conditions of glass thickness, glass temperature, glass composition, and pressure differential across the glass.

Gas comprising species of differing atomic and molecular mass is introduced through the gas inlet into the gas inlet space. The predetermined gas mass species from this gas mixture is selectively transmitted across the semipermeable quartz glass section of the mass selective fluid bandpass filter element. This filtered gas collects in gas outlet space and exits by the a filtered gas outlet. This outlet gas can be used as is or can pass through repetitive reinforced mass selective fluid filter(s) mounted in housing(s) to bring the purity of the gas to the level needed by the application, since the "Q" and selectivity may vary with differing predetermined gas species.

The semipermeable quartz glass mass selective fluid bandpass filter behaves analogous to an electrical series resonant circuit comprised of resistance, capacitance, and inductance. Gas transmission is highest at the equivalent of series resonance wherein capacitive and inductive reactances cancel and circuit transmission is limited by the direct current (DC) resistance of the circuit. In this case, resonance represents the species molecular or atomic mass in AMU.

The specific AMU at which maximum transmission occurs is influenced by factors including temperature of the glass, differential pressure across the glass, and glass composition. It has been observed that AMU of maximum transmission has a direct relationship with the temperature of the glass. There has been observed a positive correlation between AMU and glass temperature within the temperature ranges observed during experiments. With increasing temperature, a higher value of AMU generally is selectively passed.

This filter is a reinforced mass selective fluid bandpass filter in that species of a given AMU under set conditions are selectively transmitted, whereas species of higher and lower AMU values are selectively blocked. This filter exhibits a high quality, or Q, characteristic. Q is defined as relative transmission at a given AMU value compared with the rejection characteristic of species of slightly higher or lower values of AMU.

For a given set of operating characteristics of glass composition and differential pressure, the AMU value selectively passed is controlled by the temperature of the glass. Ancillary electronic apparatus (29) determine this glass temperature and keep it within a predetermined temperature range by regulating the activity of temperature change means wrapped on the glass and by regulating the temperature and rate of fluid flow through heat exchanger fluid lines (5) and within heat exchanger (4). Temperature is monitored and controlled by temperature sensors, electronics, electric cable(s) (28), heat exchanger, and temperature change means. Mass spectrometer (17) monitors gas quality.

The mass selective fluid bandpass filter element made of quartz glass provides the method whereby with constant temperature operation the reinforced mass selective fluid bandpass filter can selectively pass species of the predetermined atomic mass unit value (AMU). Observed selectivity characteristics indicate that species within 1 AMU of its range can be selectively transmitted or rejected. The given species transmitted at a given time can be changed by adjusting the glass temperature.

The method of separation of a predetermined gas from a mixture of gases or an atmosphere using the reinforced mass selective fluid bandpass filter made of quartz glass comprising the steps of: 1) providing a particle filter (1), 2) providing a pressure control device, 3) providing storage of gas in a surge tank (13), 4) monitoring pressure by a pressure sensor (15), 5) providing temperature change of the gas mixture to a predetermined temperature by a heat exchanger, 6) passing gas into a gas inlet structure, 7) containing gas at a predetermined pressure within a gas inlet space, 8) providing the mass selective fluid bandpass filter element made of quartz glass, 9) passing of predetermined gas across the mass selective fluid bandpass filter element made of quartz glass maintained at the predetermined temperature, 10) maintaining the mass selective fluid bandpass filter element made of quartz glass at a constant temperature within the temperature window of $-200$ to $+1000°$ C., 11) maintaining the pressure differential across the reinforced mass selective fluid bandpass filter within a general pressure window of range of 0 to 10,000 PSIA, 12) collecting predetermined gas within a gas outlet space, 13) passing predetermined gas out via the filtered gas outlet, 14) passing non selected gas and or gases out of the gas inlet space via a non filtered gas outlet structure.

The method of separation of the predetermined gas from the mixture of gases or an atmosphere using the mass selective fluid bandpass filter element made of quartz glass wherein the pressure of the gas within the gas inlet space is maintained by one or more of the means selected from the group consisting of: 1) a pump, 2) a pressure regulator in the inlet line, 3) a pressure regulator following the non filtered gas outlet structure, 4) pressure sensors, 5) electronics, and 6) electric cable(s). The pressure differential across the reinforced mass selective fluid bandpass filter element made of quartz glass is maintained within a general pressure window of range of 0 to 10,000 PSI. The pressure differential is set for the specific selected gas and operating conditions.

Temperature of the gas within the gas inlet space and the temperature of the reinforced mass selective fluid bandpass filter are maintained at the predetermined temperature. This temperature is maintained by one or more of the means selected from a group consisting of: 1) means regulating the temperature and rate of fluid flow through heat exchanger fluid lines and within the heat exchanger, 2) temperature change means wound directly on the glass surface of the mass selective filter, 3) temperature sensors at predetermined locations, 4) electronics, 5) and insulation (not shown) as appropriate for the given parameters of the specific application.

The method of separation of the predetermined gas from the mixture of gases or an atmosphere by maintaining the mass selective fluid bandpass filter element made of quartz glass at the predetermined temperature wherein the reinforced mass selective fluid bandpass filter element is maintained within the general temperature window of −200 to +1000° C. The temperature is set for the specific selected gas and operating conditions.

The method of separation of the predetermined gas from a mixture of gases or an atmosphere using the mass selective fluid bandpass filter element made of quartz glass provides the method of selecting a predetermined selected gas from the group comprising: $^{1}H_2$, $^{1}H^{2}H$, $^{2}H_2$, $^{1}H^{3}H$, $^{2}H^{3}H$, $^{3}H_2$, $^{1}H^{2}O$, $^{1}H_2HO$, $^{2}H_2O$, $^{1}H^{3}HO$, $^{2}H^{3}HO$, $^{3}H_2O$, $O_2$, $O_3$, $^{12}CO_2$, $^{13}CO_2$, $^{14}CO_2$, CO, $N_2$, NO, $NO_2$, NOR, $SiO_2$, FeO, $Fe_2O_3$, $SiF_4$, HF, $NH_3$, $SO_2$, $SO_3$, $H_2SO_4$, $H_2S$, $^{35}Cl_2$, $^{37}Cl_2$, $F_2$, $Al_2O_3$, CaO, MnO, $P_2O_5$, volatile organic compounds, and peroxyacyl nitrates.

The method of separation of the predetermined gas from the mixture of gases or an atmosphere using the supercooled liquid wherein the supercooled liquid consists of either pure quartz or the combination of pure quartz plus a predetermined chemical modifier in predetermined amounts. The chemical modifier is one or more elements from the group of elements with atomic numbers of: 1, 3-9, 11-17, 19-35, 37-53, 55-85, and 87-109; wherein said element is in the form from the group of: a metal, a gas, a molecule, a salt, a rare earth, an oxide, a chloride, an ion, a carbonate, an acid, a base, or other form appropriate to glass manufacturing conditions. The chemical modifier will modify gas transmittance of quartz glass to give specific selectivity characteristics and specific transmittance of gas of a predetermined AMU value, and blockage of transmission of gases of non predetermined AMU values.

Operation of the Invention

This invention includes a process improvement of the previous invention of U.S. Pat. No. 10,005,033. The unreinforced filter structure of the previous invention is not capable of withstanding a differential pressure greater than 30 PSIA. This is not acceptable for operation of this filter in gas separation other than instrumentation usage as described in our previous patent. This reinforced mass selective fluid bandpass filter of this process provides for selecting gas molecules of a specific mass from a gas sample containing molecules of two or more mass species, and is able to withstand the high pressure differentials needed for commercial application. The previous patent examiner advised that a separate patent application would be needed. This mass selective fluid bandpass filter provides a means of operation of selecting a predetermined gas from a group of gases or an atmosphere. At differing temperatures, with all other conditions equal, the gates within the quartz glass selectively open and close to the transmittance of a given specific gas.

The method of separation of the predetermined gas from a mixture of gases or an atmosphere using the mass selective fluid bandpass filter made of quartz glass provides the method of separation comprising the steps of the following operations: 1) collecting gases or the atmosphere, 2) drawing gas or gases through the particulate filter by collection apparatus selected from the group consisting of: a) a pump, b) a pressure regulator, 3) admitting gas to the surge tank wherein pressure fluctuations are dampened, 4) passing gas through the heat exchanger, 5) maintaining gas at the predetermined temperature 6) passing gas though the inlet structure into the gas inlet space, 7) maintaining the constant predetermined temperature with temperature change means wrapped about the mass selective liquid bandpass filter element, 8) providing gas selective gates of the quartz glass that are open to transmission of predetermined gas, 9) providing gas selective gates of the quartz glass that are closed to transmission of non predetermined gases, 10) collecting predetermined gas in the gas outlet space by passing predetermined gas through open gates of the mass selective fluid filter element, 11) passing predetermined gas out via the filtered gas outlet, 12) maintaining a predetermined pressure within the gas inlet space by the pressure regulator following the non filtered gas outlet structure, 13) passing non selected gas or gasses through the pressure regulator following the non filtered gas outlet structure, 14) collecting non selected gas and/or gasses in the surge tank, 15) monitoring process flow with thermocouples, pressure sensors, and mass spectrometers, 16) conducting gas flow in pipes (18), 17) monitoring process operation with electronics, 18) controlling process operation with electronics. The method of pressure regulation comprises operation of one or more devices selected from the group consisting of: a) a pump, b) a pressure regulator, c) a pressure sensor, d) an electronic circuit.

The method of separation of the predetermined gas from a mixture of gases or an atmosphere using the mass selective fluid bandpass filter element made of quartz glass provides the method method wherein the reinforced mass selective fluid bandpass filter is mounted in a housing and individual units are series connected to increase the purity of the outlet gas. The reinforced mass selective fluid bandpass filter is mounted in the housing and individual units are serially connected to remove more than one predetermined gas from the gas mixture and or atmosphere. The reinforced mass selective fluid bandpass filter is mounted in the housing and individual units are both series and serially connected as needed by the application.

An individual reinforced mass selective fluid bandpass filter mounted in a housing incorporates endcap(s) and housing to provide for a structurally sound assemblage. Depending on the application, gases exit via a non filtered gas outlet (22) and one or more selected gas outputs (24, 25, 26, 27). Additional outputs may be provided (not shown) as needed by the application.

Also not shown is that an individual reinforced mass selective fluid bandpass filter is mounted in a housing and individual units are both series and serially connected as needed by the application.

Objects and Advantages

Accordingly, besides the objects and advantages of the selective fluid bandpass filter and means of selecting a predetermined gas from a group of gases or an atmosphere described in this patent application, several objects and advantages of the present invention are:

(a) to provide for a means to commercially collect $CO_2$ from the atmosphere in commercial quantities.
(b) to provide for a means to remove noxious gases from the atmosphere.
(c) to provide for a commercial means to eliminate smog.
(d) to provide a means for collecting fusion fuel from water.

(e) to provide for a means of separating remaining fusion fuel from spent gases.

(f) to provide for a means of operating fusion reactors sequentially using waste output for fuel.

(g) to provide for a commercial means of providing fusionsynthesis.

(h) to provide for a commercial means of greenhouse gas recycling.

(i) to provide for a commercial means of obtaining carbon neutrality.

Conclusion, Ramifications, and Scope

In the descriptions above, the reader has seen several embodiments of our reinforced mass selective fluid bandpass filter and means of selecting a predetermined gas from a group of gases or an atmosphere. There are differing applications for these apparatus and means. One example is a commercial means of separation of $^2H$ from available terrestrial sources. These very different applications make best use of differing embodiments of our reinforced mass selective liquid bandpass filter.

The operational embodiment of this invention is applicable to selecting a predetermined gas from a group of gases or an atmosphere and commercial production of the predetermined gas. The basic mechanism uses the means the reinforced mass selective fluid bandpass filter to provide for the selective transmission of a gas of specific mass across the filter at high differential pressures allowing useable rates of gas flow across the filter and to provide for the selective blockage of transmission of related gases of nearly identical mass to that of the selected gas. Furthermore, the reinforced mass selective fluid bandpass filter and means of this invention has the additional advantages in that:

(a) the gas mass selected for transmission is controlled by the temperature of the filter.

(b) gases of nearby lower mass are selectively rejected.

(c) gases of nearby higher mass are selectively rejected.

(d) the gas mass selected for transmission is adjustable by changing the temperature of the filter.

(e) to provide for commercial equipment for production of the predetermined, selected gas.

(f) to provide for removal of noxious gases from an atmosphere.

(g) to provide for removal of greenhouse gases from an atmosphere.

(h) to provide production of purified gases for hydrocarbon synthesis.

(i) to provide for production of predetermined substrate gases for industrial processes.

(j) to provide for a commercial means of fusion reactor fuel production.

(k) to provide for a commercial means of target material for neutron detectors used for laboratory fusion experiments.

(l) to provide for a commercial means of target material for neutron detectors used for laboratory experiments.

(m) to provide for a commercial means of target material for neutron detectors used in portable nuclear security monitors.

While our above description contains many specificities, these should not be construed as limitations on the scope of the invention, but rather as an exemplification of one preferred embodiment thereof. Many other variations are possible. For example:

(a) thinning the quartz glass membrane from that of our initial experimental conditions.

(b) applying pressure to the gas in contact with the glass.

(c) increasing the pressure differential across the glass.

(d) using a multiplicity of tubes in the filter structure.

(e) supporting thin quartz glass layers by support with sintered quartz glass.

(f) high-temperature heating to fuse the glass covering over the supporting sintered material.

(g) increasing the quartz glass membrane thickness to raise "Q".

In the descriptions above, we have put forth theories of operation that we believe to be correct. While we believe these theories to be correct, we don't wish to be bound by them. While there have been described above the principals of this invention in connection with specific apparatus, it is to be clearly understood that this description is made only by way of example and is not as a limitation to the scope of the invention. Accordingly, the scope of the invention should be determined not by the embodiment(s) illustrated, but by the appended claims and their legal equivalents.

I claim:

1. A method of separation of a predetermined gas from a mixture of gases or an atmosphere, wherein the method of separation of a predetermined gas from a mixture of gases or an atmosphere comprises passing the mixture of gases or an atmosphere through a reinforced mass selective fluid bandpass filter made of quartz glass wherein the predetermined gas is separated from the mixture of gases or an atmosphere, wherein the predetermined gas is from a group comprising: $^1H_2$, $^1H^2H$, $^2H_2$, $^1H^3H$, $^2H^3H$, $^3H_2$, $^1H_2O$, $^1H^2HO$, $^2H_2O$, $^1H^3HO$, $^2H^3HO$, $^3H_2O$, $O_2$, $O_3$, $^{12}CO_2$, $^{13}CO_2$, $^{14}CO_2$, $CO$, $N_2$, $NO$, $NO_2$, $NO_x$, $SiO_2$, $FeO$, $Fe_2O_3$, $SiF_4$, $HF$, $NH_3$, $SO_2$, $SO_3$, $H_2SO_4$, $H_2S$, $^{35}Cl_2$, $^{37}Cl_2$, $F_2$, $Al_2O_3$, $CaO$, $MnO$, $P_2O_5$, volatile organic compounds, and peroxyacyl nitrates.

2. The method of separation of the predetermined gas from the mixture of gases or an atmosphere using the reinforced mass selective fluid bandpass filter made of quartz glass of claim 1, wherein the reinforced mass selective fluid bandpass filter comprises a mass selective fluid bandpass filter element made of quartz glass is permanently affixed to a sintered metal load being structure.

3. The method of separation of a predetermined gas from a mixture of gases or an atmosphere using the reinforced mass selective fluid bandpass filter made of quartz glass of claim 1, wherein said method of separation of the predetermined gas from the mixture of gases or an atmosphere comprising the steps of:

providing a particle filter, providing a pressure control device, providing storage of gas in a surge tank, monitoring pressure by a pressure sensor, providing temperature change of the gas mixture to a predetermined temperature by a heat exchanger, passing gas into a gas inlet structure, containing gas at a predetermined pressure within a gas inlet space, providing the mass selective fluid bandpass filter element made of quartz glass, passing of predetermined gas across the mass selective fluid bandpass filter element made of quartz glass maintained at the predetermined temperature, maintaining the mass selective fluid bandpass filter element made of quartz glass at a constant temperature within a temperature window of −200 to +1000° C., maintaining the pressure differential across the reinforced mass selective fluid bandpass filter element within a general pressure window of range of 0 to 10,000 PSIA, collecting predetermined gas within a gas outlet space, passing predetermined gas out via a filtered gas outlet, passing non selected gas and or gases out of the gas inlet space via a non filtered gas outlet structure.

4. The method of separation of the predetermined gas from the mixture of gases or an atmosphere using the mass selective fluid bandpass filter element made of quartz glass of claim 2, wherein the mass selective fluid bandpass filter element made of quartz glass consists of a supercooled liquid.

5. The method of separation of the predetermined gas from the mixture of gases or an atmosphere using the mass selective fluid bandpass filter element made of quartz glass of claim 2, wherein the method of separation of the predetermined gas from a mixture of gases or an atmosphere using the mass selective fluid bandpass filter element made of quartz glass provides the method of selecting a predetermined selected gas from the group comprising: $^1H_2$, $^1H^2H$, $^2H_2$, $^1H^3H$, $^2H^3H$, $^3H_2$, $^1H_2O$, $^1H^2HO$, $^2H_2O$, $^1H^3HO$, $^2H^3HO$, $^3H_2O$, $O_2$, $O_3$, $^{12}CO_2$, $^{13}CO_2$, $^{14}CO_2$, CO, $N_2$, NO, $NO_2$, $NO_N$, $SiO_2$, FeO, $Fe_2O_3$, $SiF_4$, HF, $NH_3$, $SO_2$, $SO_3$, $H_2SO_4$, $H_2S$, $^{35}Cl_2$, $^{37}Cl_2$, $F_2$, $Al_2O_3$, CaO, MnO, $P_2O_5$, volatile organic compounds, and peroxyacyl nitrates.

6. The method of separation of the predetermined gas from the mixture of gases or an atmosphere using the supercooled liquid of claim 4, wherein the supercooled liquid is of either natural or manmade origin.

7. The method of separation of the predetermined gas from the mixture of gases or an atmosphere using the supercooled liquid of claim 4, wherein the supercooled liquid consists of either pure quartz or the combination of pure quartz plus a predetermined chemical modifier in predetermined amounts.

8. The method of separation of the predetermined gas from the mixture of gases or an atmosphere using the chemical modifier of claim 7, wherein the chemical modifier is one or more elements from the group of elements with atomic numbers of: 1, 3-9, 11-17, 19-35, 37-53, 55-85, and 87-109; wherein the element is in the form from the group of: a metal, a gas, a molecule, a salt, a rare earth, an oxide, a chloride, an ion, a carbonate, an acid, a base, or other form appropriate to glass manufacturing conditions.

9. The method of separation of the predetermined gas from the mixture of gases or an atmosphere using the chemical modifier of claim 7, wherein the chemical modifier will modify gas transmittance of quartz glass to give specific selectivity characteristics, and specific transmittance of gas of a predetermined AMU value, and blockage of transmission of gases of non predetermined AMU values.

10. The method of separation of the predetermined gas from the mixture of gases or an atmosphere by maintaining the mass selective fluid bandpass filter element made of quartz glass at the predetermined temperature of claim 3, wherein the maintaining the mass selective fluid bandpass filter element made of quartz glass at the predetermined temperature, the reinforced mass selective fluid bandpass filter element is maintained within the general temperature window of −200 to +1000° C.

11. The method of separation of the predetermined gas from the mixture of gases or an atmosphere using the mass selective fluid bandpass filter element made of quartz glass of claim 2, wherein the pressure differential across the mass selective fluid bandpass filter element made of quartz glass is maintained within the general pressure window of range of 0 to 10,000 PSI.

12. The method of separation of the predetermined gas from the mixture of gases or an atmosphere using the mass selective fluid bandpass filter element made of quartz glass of claim 2, wherein the method of separation of the predetermined gas from a mixture of gases or an atmosphere using the mass selective fluid bandpass filter element made of quartz glass provides the method by which the specific atomic mass unit at which maximum transmission occurs is influenced by factors including temperature of the mass selective fluid bandpass filter element made of quartz glass, thickness of the mass selective fluid bandpass filter element made of quartz glass, differential pressure across the mass selective fluid bandpass filter element made of quartz glass, and composition of the mass selective fluid bandpass filter element made of quartz glass.

13. The method of separation of the predetermined gas from the mixture of gases or an atmosphere using the reinforced mass selective fluid bandpass filter made of quartz glass of claim 1, wherein the method of separation of the predetermined gas from the mixture of gases or an atmosphere using the reinforced mass selective fluid bandpass filter made of quartz glass provides the method for very selective filtering of gases of close atomic mass unit values within the operational range of this filter.

14. The method of separation of the predetermined gas from the mixture of gases or an atmosphere using the reinforced mass selective fluid bandpass filter made of quartz glass of claim 1, wherein the method of separation of the predetermined gas from a mixture of gases or an atmosphere using the mass selective fluid bandpass filter made of quartz glass provides the method wherein the atomic mass unit of maximum transmission has a direct relationship with the temperature of the mass selective fluid bandpass filter element made of quartz glass.

15. The method of separation of the predetermined gas from a mixture of gases or an atmosphere using the mass selective fluid bandpass filter made of quartz glass of claim 2, wherein the method of separation of the predetermined gas from a mixture of gases or an atmosphere using the mass selective fluid bandpass filter made of quartz glass provides the method wherein a species of a given atomic mass unit under set conditions is selectively transmitted, wherein species of higher and lower atomic mass unit values are selectively blocked, wherein the reinforced mass selective fluid bandpass filter element exhibits a high quality, or "Q" characteristic.

16. The method of separation of the predetermined gas from the mixture of gases or an atmosphere using the mass selective fluid bandpass filter element made of quartz glass of claim 2, wherein the method of separation of the predetermined gas from a mixture of gases or an atmosphere using the mass selective fluid bandpass filter element made of quartz glass provides the method that is selectively semi-permeable to gases to be filtered by this apparatus.

17. The method of separation of the predetermined gas from the mixture of gases or an atmosphere using the mass selective fluid bandpass filter element made of quartz glass of claim 2, wherein the method of separation of the predetermined gas from a mixture of gases or an atmosphere using the mass selective fluid bandpass filter element made of quartz glass provides the method whereby with constant temperature operation the reinforced mass selective fluid bandpass filter can selectively pass species of a predetermined atomic mass unit value.

18. The method of separation of the predetermined gas from the mixture of gases or an atmosphere using the mass selective fluid bandpass filter element made of quartz glass of claim 2, wherein the method of separation of the predetermined gas from a mixture of gases or an atmosphere using the mass selective fluid bandpass filter element made of quartz glass provides the method for very selective filtering of gases of close atomic mass unit values within the operational range of this filter.

19. The method of separation of the predetermined gas from the mixture of gases or an atmosphere using the reinforced mass selective fluid bandpass filter made of quartz glass of claim 1, wherein the method of separation of the predetermined gas from a mixture of gases or an atmosphere using the mass selective fluid bandpass filter made of quartz glass provides the method of separation comprising the steps of the following operations:

- collecting gases or the atmosphere,
  - drawing gas or gases through the particulate filter by collection apparatus selected from the group consisting of: a) a pump, b) a pressure regulator,
- admitting gas to the surge tank wherein pressure fluctuations are dampened,
- passing gas through the heat exchanger,
- maintaining gas at the predetermined temperature,
- passing gas though the inlet structure into the gas inlet space,
- maintaining the constant predetermined temperature with temperature change means wrapped about the mass selective liquid bandpass filter element,
- providing gas selective gates of the quartz glass that are open to transmission of predetermined gas,
- providing gas selective gates of the quartz glass that are closed to transmission of non predetermined gases,
- collecting predetermined gas in the gas outlet space by passing predetermined gas through open gates of the mass selective fluid filter element,
- passing predetermined gas out via the filtered gas outlet,
- maintaining a predetermined pressure within the gas inlet space by the pressure regulator following the non filtered gas outlet structure,
- passing non selected gas or gasses through the pressure regulator following the non filtered gas outlet structure,
- collecting non selected gas and/or gasses in the surge tank,
- monitoring process flow with thermocouples, pressure sensors, and mass spectrometers,
- conducting gas flow in pipes,
- monitoring process operation with electronics,
- controlling process operation with electronics.

20. The method of separation of the predetermined gas from the mixture of gases or an atmosphere using the reinforced mass selective fluid bandpass filter made of quartz glass of claim 1, wherein the reinforced mass selective fluid bandpass filter is mounted in a housing and individual units are series connected to increase the purity of the outlet gas.

21. The method of separation of the predetermined gas from the mixture of gases or an atmosphere using the reinforced mass selective fluid bandpass filter made of quartz glass of claim 1, wherein the reinforced mass selective fluid bandpass filter is mounted in the housing and individual units are serially connected to remove more than one predetermined gas from the gas mixture and or atmosphere.

22. The method of separation of the predetermined gas from the mixture of gases or an atmosphere using the reinforced mass selective fluid bandpass filter made of quartz glass of claim 1, wherein the reinforced mass selective fluid bandpass filter is mounted in the housing and individual units are both series and serially connected as needed by the application.

23. The method of separation of a predetermined gas from a mixture of gases or an atmosphere using the reinforced mass selective fluid bandpass filter made of quartz glass of claim 3, wherein the pressure control device comprises one or more devices selected from the group consisting of: a) a pump, b) a pressure regulator, c) a pressure sensor, d) an electronic circuit.

\* \* \* \* \*